United States Patent
Kanechika et al.

(10) Patent No.: US 8,597,743 B2
(45) Date of Patent: Dec. 3, 2013

(54) ALUMINUM NITRIDE SINTERED BODY

(75) Inventors: Yukihiro Kanechika, Shunan (JP); Masanobu Azuma, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 756 days.

(21) Appl. No.: 12/063,389

(22) PCT Filed: Aug. 4, 2006

(86) PCT No.: PCT/JP2006/315480
§ 371 (c)(1),
(2), (4) Date: Feb. 8, 2008

(87) PCT Pub. No.: WO2007/018140
PCT Pub. Date: Feb. 15, 2007

(65) Prior Publication Data
US 2009/0041961 A1 Feb. 12, 2009

(30) Foreign Application Priority Data

Aug. 11, 2005 (JP) .................... 2005-233454

(51) Int. Cl.
B32B 1/00 (2006.01)
B32B 1/02 (2006.01)
B32B 1/08 (2006.01)
C04B 35/00 (2006.01)

(52) U.S. Cl.
USPC .................... 428/34.4; 501/98.4; 501/98.5

(58) Field of Classification Search
USPC ........... 428/34.1, 34.4, 34.6, 34.7, 35.7, 36.4, 428/36.9, 36.91, 36.92; 501/98.4, 98.5
See application file for complete search history.

(56) References Cited

U.S. PATENT DOCUMENTS

| | | | | |
|---|---|---|---|---|
| 4,950,435 A | * | 8/1990 | Taniguchi et al. | 264/674 |
| 5,289,351 A | * | 2/1994 | Kashima et al. | 362/627 |
| 5,780,377 A | | 7/1998 | Wajima et al. | |
| 7,081,425 B2 | * | 7/2006 | Kanechika et al. | 501/98.4 |

FOREIGN PATENT DOCUMENTS

| | | |
|---|---|---|
| EP | 1518843 A2 | 3/2005 |
| JP | 60193254 A | 10/1985 |
| JP | 2026871 A | 1/1990 |
| JP | 02088467 A | 3/1990 |
| JP | 2212365 A | 8/1990 |
| JP | 6172041 A | 6/1994 |
| JP | 2000302543 A | 10/2000 |
| JP | 2005119953 A | 5/2005 |
| JP | 2005166454 A | 6/2005 |
| WO | 9506622 A1 | 3/1995 |

OTHER PUBLICATIONS

Machine translation of JP 2005 166454 from go.jpo.jp (specification), obtained Sep. 9, 2010.*
Machine translation of JP 2005 166454 from go.jpo.jp (claims), obtained Sep. 29, 2010.*

* cited by examiner

*Primary Examiner* — Walter B Aughenbaugh
(74) *Attorney, Agent, or Firm* — The Webb Law Firm

(57) ABSTRACT

Provided is an aluminum nitride sintered body with high optical transmissivity and which has a smooth surface in the unpolished condition after firing. The aluminum nitride sintered body has an oxygen concentration of 450 ppm or less, a concentration of impurity elements excluding oxygen, nitrogen, and aluminum of 350 ppm or less, and an average crystal grain diameter of between 2 μm and 20 μm, and also has an arithmetic mean surface height Ra of 1 μm or less and a maximum height Rz of 10 μm or less in the unpolished condition after firing.

3 Claims, 1 Drawing Sheet

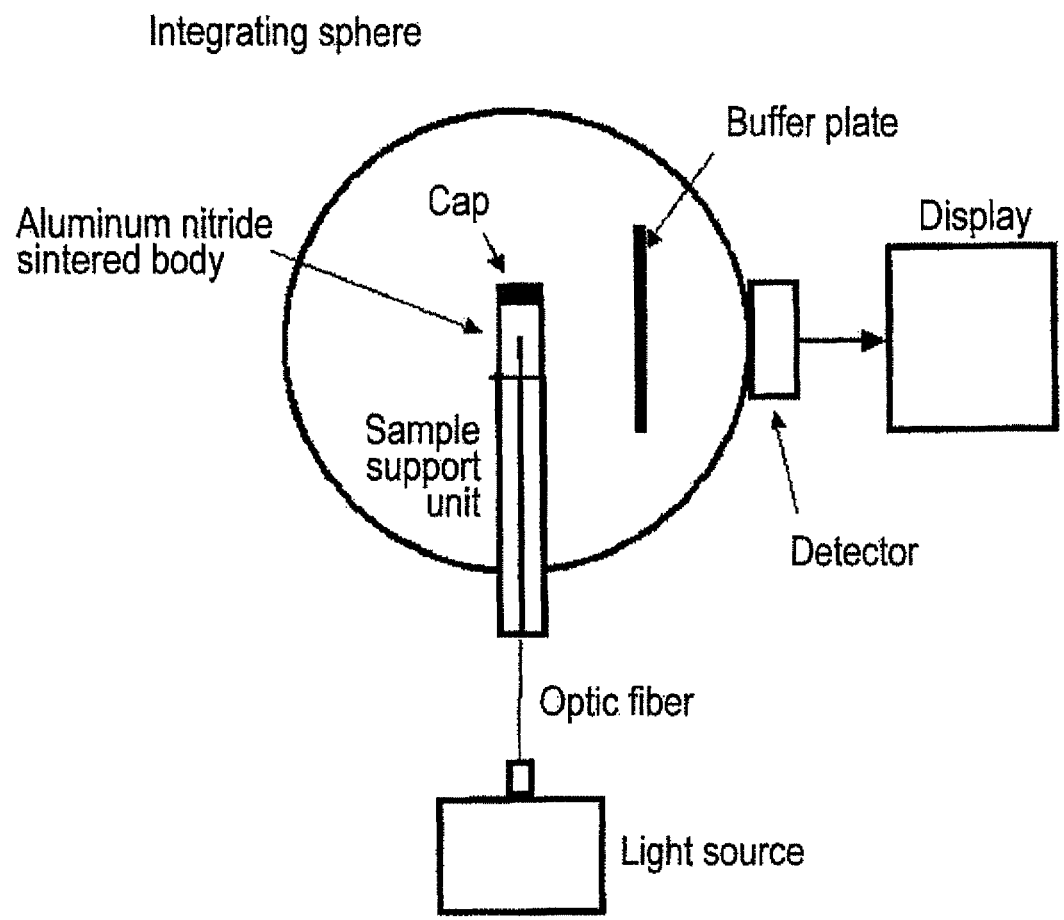

ALUMINUM NITRIDE SINTERED BODY

TECHNICAL FIELD

The present invention relates to a new aluminum nitride sintered body. In further detail, the present invention relates to a sintered body with high purity, and which has high optical transmissivity by having a smooth surface in the unpolished condition after firing.

BACKGROUND ART

Conventionally, the material of an arc tube of a high-pressure discharge lamp uses translucent alumina in place of quartz because the transluent alumina has a high thermal resistance of 1100° C. or higher and the arc tube can be manufactured at a relatively low cost.

However, a high-pressure discharge lamp that uses an arc tube made of alumina has a short life of approximately 9000 hours. This is primarily caused by the low thermal shock resistance of alumina. Furthermore, when alumina is used in a metal halide lamp, the life of the lamp is even shorter because of the low corrosion resistance of alumina with regards to metal halide gases.

Therefore, an arc tube that uses aluminum nitride with high translucency has been proposed (Patent Documents 1, 2, etc.) Aluminum nitride has thermal shock resistance and corrosion resistance that are superior to those of alumina, thus helping to extend the life of the lamp.

The aforementioned ceramic arc tube is obtained by mixing alumina or aluminum nitride powder with a binder resin, and forming the mixture into a prescribed shape, which is then sintered. For use as a material for an arc tube, excellent optical transmissivity is particularly required, in addition to thermal shock resistance and corrosion resistance.

In order to increase the optical transmissivity of an aluminum nitride sintered body, Patent Document 1 discloses that an AlN sintered body with a transmissivity of 75% in the wavelength band between 0.2 μm and 30 μm can be obtained by firing raw material with a specific raw material powder particle diameter, metal impurity content, and oxygen content, in an inert atmosphere at a temperature between 1700 and 2100° C.

Furthermore, Patent Document 2 discloses an arc tube that includes a translucent cover (hollow tube) made of an aluminum nitride sintered body manufactured using raw material aluminum nitride powder with a particle size distribution where no less than 70% of the particles have a diameter between 0.3 D and 1.8 D (D: average particle diameter). Furthermore, an embodiment of this publication discloses an aluminum nitride sintered body with a whole light transmissivity of 84%.

Furthermore, Patent Document 3 discloses an aluminum nitride sintered body where the oxygen concentration is controlled to 400 ppm or less, the metal impurity concentration is controlled to 150 ppm or less, the carbon concentration is controlled to 200 ppm or less, and the average crystal grain diameter is between 2 μm and 20 μm. This sintered body has an optical spectrum curve with a slope of 1.0 (%/nm) or greater in the wavelength band between 260 and 300 nm, an optical transmissivity of 86% or higher in the wavelength band between 400 and 800 nm, and an optical spectrum that reaches an optical transmissivity of 60% at a wavelength of 400 nm or less.

[Patent Document 1] Japanese Unexamined Patent Application Publication No. H2-26871
[Patent Document 2] Japanese Unexamined Patent Application Publication No. S60-193254
[Patent Document 3] Japanese Unexamined Patent Application Publication No. 2005-119953

Problems to Be Solved by the Invention

As described above, various proposals have been made for improving the optical characteristics of an aluminum nitride sintered body.

Ceramic materials such as aluminum nitride or the like are known to acquire improved optical characteristics by polishing. Generally, as the surface roughness decreases, the optical characteristics (optical transmissivity) of the sintered body is said to improve, and an improvement in the optical transmissivity by mirror surface polishing the surface of the sintered body can be anticipated.

However, for articles which have a complex surface shape (three-dimensional surface) such as an arc tube, surface polishing, and especially mirror surface polishing, is not easy. Furthermore, as described above, an aluminum nitride sintered body which has improved translucency by increasing the purity is known, but the surface cannot be said to have sufficient smoothness, and there still remains room for improvement.

Therefore, there is demand for an aluminum nitride sintered body with high optical transmissivity which has a smooth surface in the unpolished condition after firing. p The following means are provided by the present invention in order to resolve the aforementioned problems.

(1) An aluminum nitride sintered body with an oxygen concentration of 450 ppm or lower, an impurity element concentration excluding oxygen, nitrogen, and aluminum of 350 ppm or less, an average crystal grain diameter of between 2 μm and 20 μm, an arithmetic mean surface height Ra of 1 μm or less, and an arithmetic maximum surface height Rz of 10 μm or less.

(2) The aluminum nitride sintered body according to (1) having an unpolished condition after firing. (3) An arc tube comprising the aluminum nitride sintered body according to (1) or (2).

The present invention provides an aluminum nitride sintered body that can be suitably used as arc tube material for a light source with high optical transmissivity and especially high illumination efficiency, and which has a smooth surface in an unpolished condition after firing. This type of aluminum nitride sintered body can be used as an arc tube material even without a separate polishing process. Therefore, the use of the aluminum nitride sintered body of the present invention is particularly preferable for manufacturing arc tubes which are difficult to polish because of a complex shape.

BRIEF DESCRIPTION OF THE DRAWING

The drawing shows a schematic illustration of an optical transmissivity measuring device.

DETAILED DESCRIPTION OF THE INVENTION

The present invention will be described in further detail, including preferred embodiments.

In the unpolished condition, the aluminum nitride sintered body of the present invention has an arithmetic mean surface height Ra of 1 μm or less, preferably 0.8 μm or less, more preferably 0.7 μm or less, and particularly preferably 0.5 μm or less, and a maximum height Rz of 10 μm or less, preferably 8 μm or less, even more preferably 6 μm or less, and particularly preferably 5 μm or less.

Herein, the arithmetic mean height Ra and the arithmetic maximum height Rz are the values measured in accordance with JISB0601-2001 (conforming to ISO4287-1997) and the details of the measurement conditions will be described later.

As described above, the aluminum nitride sintered body of the present invention has a smooth surface in the unpolished condition, and as will be described later, the impurity concentration (concentration of components excluding aluminum and nitrogen) is controlled to a very low range, and therefore the sintered body shows excellent optical transmissivity, and the overall transmissivity in the shape of a tube for example preferably reaches 80% or higher, and even more preferably reaches 90% or higher.

Note, the specific method of evaluating the overall transmissivity will be described in Examples.

With the aluminum nitride sintered body of the present invention, the concentration of impurities (concentration of components other than aluminum and nitrogen) is controlled to a very low range. Specifically, the concentration of oxygen is preferably controlled to 450 ppm or less, but 300 ppm or less is particularly preferable, and the concentration of other impurities is preferably controlled to 350 ppm or less, but 200 ppm or less is particularly preferable.

Note, the concentration of other impurities refers to the concentration of elements other than oxygen, nitrogen, and aluminum, and refers to the total concentration of metals derived from sintering agents, other metals (such as metals derived from inevitable contaminants inherently present in the raw material powder), and carbon and the like.

Furthermore, the concentration of carbon in the aluminum nitride sintered body is preferably controlled to 200 ppm or lower.

The aluminum nitride sintered body of the present invention is obtained by firing at specific heating conditions using a specific amount of a specific sintering agent as will be described later. Therefore the concentration of impurities will be dramatically reduced compared to a conventionally known aluminum nitride sintered body. Furthermore, the smoothness in the unpolished condition after sintering is excellent, and therefore the optical characteristics will be excellent as shown by Examples which will be described later. For example, an aluminum nitride sintered body of the present invention where the concentration of impurities is controlled to the aforementioned range and the smoothness of the surface has been controlled will have high optical transmissivity with whole light transmissivity in the visible light band of 80% or higher.

Conventionally, a commonly known aluminum nitride sintered body is manufactured by firing without using a sintering agent in order to avoid reducing the transmissivity due to an increase in the impurity content. In this case, however, oxygen, which is an impurity, cannot be sufficiently eliminated, and even if a sintering agent is used, a portion of the sintering agent is often left as residue, depending on the sintering conditions. By attempting to sufficiently eliminate this residue, the surface of the sintered body will be made rough, and therefore a smooth surface cannot be obtained in the unpolished condition. Thus, conventional technology has been unable to control the concentration of impurities to the aforementioned range, and to control the surface smoothness and therefore achieving the aforementioned optical characteristics has been difficult.

Furthermore, it is important that the aluminum nitride sintered body of the present invention have an average crystal grain diameter between 2 and 20 μm, and preferably in a range between 5 and 15 μm. In other words, if the average crystal grain diameter is less than 2 μm, the translucency of the aluminum nitride sintered body will be reduced, and if the average crystal grain diameter exceeds 20 μm, the strength of the aluminum nitride sintered body will be dramatically lower, and the effective strength will be insufficient when used as a translucent cover, for example. The sintered body of the present invention has an aluminum nitride average crystal grain diameter within the aforementioned range, and therefore will have the aforementioned excellent optical characteristics while also showing high strength, and for example, the effective flexural strength will be 300 MPa or higher.

As described above, the aluminum nitride sintered body has excellent optical transmissivity, and can preferably be used as an arc tube material.

Furthermore, the aluminum nitride sintered body of the present invention also provides the high thermal conductivity inherent in aluminum nitride sintered bodies, and preferably has a thermal conductivity of 170 W/mK or higher, more preferably 190 W/mK or higher, and particularly preferably 200 W/mK or higher.

An aluminum nitride sintered body with the aforementioned characteristics can preferably be used as an arc tube material because of having excellent optical characteristics based on the high surface smoothness as described above in addition to the high thermal conductivity and high chemical corrosion resistance inherent in aluminum nitride.

Furthermore, when the sintered body is applied to an application of a translucent cover such as an ultraviolet light transparent window, high ultraviolet light transmissivity can be achieved because of the aforementioned optical characteristics.

Note, the optical transmissivity and the aforementioned various properties, particularly the arithmetic mean surface height Ra and the arithmetic maximum surface height Rz of the aluminum nitride sintered body of the present invention, refers to the physical properties in the condition after firing and before polishing, or in other words immediately after firing (as fired).

Generally, the arithmetic mean height Ra of ceramic materials will be reduced by polishing. In particular, the value of Ra can be dramatically reduced by mirror surface polishing. Furthermore, the optical characteristics of ceramic materials are often related to the arithmetic mean height Ra, and the optical characteristics of the ceramic material improve as the arithmetic mean height Ra becomes smaller. Therefore, optical ceramics are commonly polished.

On the other hand, during normal polishing with a grindstone, particles can shed from the sintered body which is the object of grinding. Consequently, the maximum height Rz of the surface will not be reduced but rather will be degraded increased more than prior to polishing. Shedding is a phenomenon where the crystal grains that make up the ceramic material are broken off by the impact during polishing, and a void corresponding to the size of the broken off particle is formed on the surface. Therefore, the maximum height Rz of the surface will be higher than before polishing.

In contrast, the aluminum nitride sintered body of the present invention has excellent smoothness, or in other words, low values for both Ra and Rz in the unpolished condition after firing. Therefore, the aluminum nitride sintered body of the present invention is extremely effective for providing excellent translucency to a sintered body with a three-dimensional surface such as curved surfaces and bent surfaces, where polishing, in particular mirror surface polishing, is difficult.

Of course, the sintered body of the present invention can be polished, depending on the shape, application, and the required physical properties.

Next, a specific example of a manufacturing method for the aluminum nitride sintered body of the present invention will be described, but the aluminum nitride sintered body of the present invention is not restricted in particular to this manufacturing method, so long as the aforementioned physical properties are possessed.

The aluminum nitride sintered body of the present invention can be obtained by forming a mixture of aluminum nitride powder and a specific amount of a calcium aluminate type sintering agent in a prescribed shape (for example, arc tube shaped; specifically a tube shape, spherical shape, or combined shape thereof as will be described later), and then firing the molded body in a reducing atmosphere at specific temperature conditions.

The aluminum nitride powder that is used as a raw material preferably has a particle diameter that can achieve a crystal grain diameter of between 2 and 20 μm when sintered. Generally, powder that has an average particle diameter slightly smaller than the aforementioned crystal grain diameter is preferably used when considering the crystal growth during firing. Therefore, for example, the particle diameter will be between 0.5 and 15 μm, and preferably between 0.5 and 10 μm.

Furthermore, the aluminum nitride powder has high purity at 97 wt % or higher, and preferably 99 wt % or higher in order to control the concentration of impurities in the sintered body to a low concentration range. Most preferably, a highly pure aluminum nitride is used where the concentration of metal impurities (concentration of metals other than Al) is reduced to 50 ppm or less, and the concentration of oxygen is reduced to 1 wt % or less, particularly 0.8 wt % or less.

Furthermore, aluminum nitride powder with carbon as an impure substance can be used in order to reduce the concentration of oxygen in the sintered body. In other words, in the presence of carbon, the oxygen included as an impurity will react with the carbon through firing, and can be removed as carbon dioxide gas. However, if excess carbon is included in the raw material powder, the carbon will remain as an impurity in the sintered body, and there is a possibility that translucency will be lost, and therefore the concentration of carbon in the aluminum nitride powder will be no greater than 1500 ppm.

As described above, examples of sintering agents that can be used include calcium aluminates such as $Ca_3Al_2O_6$ ($3CaO.Al_2O_3$), and $CaAl_2O_4$ ($CaO.Al_2O_3$) and the like. In particular, the oxygen impurity included in the raw material aluminum nitride powder can be effectively eliminated by using $Ca_3Al_2O_6$. Furthermore, using $Ca_3Al_2O_6$ as the sintering agent and firing at certain temperature conditions, which will be described later, are preferable because the agent will vaporize after sintering is complete and the concentration of the various impurities can be further reduced, and thereby the optical characteristics of the sintered body can be further enhanced.

The amount of the aforementioned sintering agent used is generally between 1 and 15 weight parts for 100 weight parts of aluminum nitride powder, and in particular, is preferably in a range between 1 and 10 weight parts in order to control the concentration of the various impurities to the aforementioned range, and to obtain an aluminum nitride sintered body with excellent optical characteristics such as translucency.

Mixing of the aluminum nitride powder and the sintering agent powder can be performed by a commonly known method. For example, either wet or dry mixing using a blender such as a ball mill or the like can preferably be used. Furthermore, a dispersing medium such as an alcohol or a hydrocarbon is used with wet mixing, and the use of an alcohol or a hydrocarbon is preferable from the viewpoint of dispersability.

Note, in the mixing, a sintering agent powder that has been stored in dry air, and if necessary vacuum dried, shall be promptly mixed with the aluminum nitride powder in order to prevent the sintering agent from absorbing water and from forming aggregates.

Prior to firing, the aforementioned powder mixture is formed to a prescribed shape depending on the application. The mixture may be formed by a commonly known method. The use of an organic binder is acceptable in order to form a formed body with increased strength and to increase the yield.

For example, the molded body can be fabricated by preparing a slurry or paste for forming by mixing the aforementioned powder mixture with organic binder, and if necessary a dispersing agent, plasticizer, or solvent or the like, and then forming the slurry or paste for forming into a prescribed shape using a method such as a doctor blade method, extrusion forming method, injection molding method, or cast forming method or the like. Examples of the organic binder include butyral resins such as polyvinyl butyral, and acrylic resins such as butyl polymethacrylate and the like, and these organic binders can be used in an amount of 0.1 to 30 parts by weight, and particularly, 1 to 15 parts by weight per 100 parts by weight of the aluminum nitride powder. Furthermore, glycerin compounds and the like can be suggested as the dispersing agent, phthalate esters and the like can be suggested as the plasticizer, and isopropyl alcohol or other hydrocarbons or the like can be used as the solvent.

Furthermore, the molded body may be prepared by the compression molding method can be performed without using an organic binder. For example, a mixed powder of aluminum nitride powder and the sintering agent powder can be fabricated into a temporary molded body using a monoaxial molding machine, and a final molded body can be fabricated by compression molding the temporary molded body using a CIP (cold isostatic press) molding machine under a pressure of between 1 and 4 t/cm².

The molded body obtained is subjected to firing after being degreased (removing the binder).

Dewaxing can be performed by heating in any atmosphere such as in air, nitrogen, or hydrogen, but dewaxing is preferably performed in a nitrogen environment where the amount of residual carbon can easily be adjusted. Furthermore, the dewaxing temperature will vary depending on the type of organic binder, but generally the temperature is between 300 and 900° C., and between 300 and 700° C. is particularly suitable. If forming is performed without using an organic binder, as with the compression molding method, the aforementioned dewaxing process will not be necessary.

Firing is performed in a reducing atmosphere in order to effectively remove the sintering agent and to reduce the concentration of metal impurities and the concentration of oxygen in the sintered body.

In a most preferable method for performing firing in the aforementioned reducing atmosphere, a non-carbon container such as an aluminum nitride sintered body or a boron nitride molded body is used as the container for firing, and a carbon generating source is provided outside of this container supply carbon compounds carbons or hydrocarbons in a gaseous state to the container for firing. In other words, if a molded body and a carbon generating source are coexistent in the container for firing, the reducing concentration will be too high and the reducing strength will be too strong, so that the vaporizing speed of the sintering agent may be high. Therefore, the surface roughness of the aluminum nitride sintered body after sintering might be increased.

Note, the concentration of carbon in the aforementioned container can be adjusted using a gap that is formed between the container and a lid, or a small hole can be opened in the container.

Furthermore, the aforementioned carbon generating source is not particularly restricted, but commonly known forms of carbon such as amorphous carbon or graphite can be used, and solid carbon is preferred. The shape of the carbon is not particularly restricted, and the carbon may be in the form of a powder, a fiber, a felt, a sheet, or a plate, or may be a combination thereof. Among these, plate-like amorphous carbon or graphite is preferred from the perspective of achieving high thermal conductivity.

The firing is conducted in the reducing atmosphere at a temperature between 1500 and 2000° C., preferably between 1600 and 1950° C., and even more preferably between 1700 and 1900° C., for at least 3 hours, and at least 10 hours is particularly preferable. Furthermore, if the firing is conducted for extended periods of time, the crystal particles of the aluminum nitride sintered body will grow, and in addition, the carbon concentration in the sintered body will increase, so the firing time in the reducing atmosphere is preferably no more than 100 hours, particularly no more than 50 hours, and most preferably no more than 30 hours. If the firing is performed in a reducing atmosphere for an extended period of time, the concentration of carbon will increase even though the concentration of metal impurities is controlled to within the aforementioned range, and as a result, there is a possibility that the optical characteristics of the sintered body will be lost.

The aluminum nitride sintered body of the present invention can be obtained through the aforementioned firing process.

Furthermore, the optical transmissivity of the aluminum nitride sintered body can be further increased by heat treating (annealing treatment) the sintered body in the presence of an aluminum compound with high temperature degradability. The coexisting aluminum compound with high temperature degradability is preferably a material that exists stably in the middle and later stages of the firing and that discharges an aluminum gas in a gaseous phase. In other words, the material preferably is stable at temperatures above 1000° C. and yet discharges an aluminum gas. Examples include $Al_2O_3$, $Al_2S_3$, $AlF_3$, and AlN and the like. Note, the aluminum nitride that is used as the aluminum compound with high temperature degradability is different than the sintered body of the present invention obtained by the aforementioned firing process, and will have sustained release of aluminum gas at a temperature of approximately 1500° C. The sustained release of a gas by aluminum nitride with high temperature degradability is thought to be caused by the composition and structure of the grain boundary phase. These aluminum compounds with high temperature degradability can be in any form such as a powder, a formed body, or a sintered body or the like, and the same effect can also be obtained by exposing the aforementioned sintered body to a gasified aluminum compound. In an annealing process, $N_2$ gas is flowed at a rate of between 0.1 and 30 L/minute. The annealing temperature is between 1600 and 2000° C., and annealing is performed for between 1 and 200 hours using a firing container made from materials such as dense carbon, boron nitride, or aluminum nitride in the presence of the aluminum compound with high temperature degradability in the firing container.

While not wishing to be registered by theory, it is thought that the aluminum fills in vacancy-type defects in the sintered body as a result of the aforementioned annealing treatment, thereby to form aluminum nitride crystal grains that are or essentially are perfect crystals, thus improving the optical characteristics such as optical transmissivity and the like. The aluminum nitride sintered body of the present invention that is obtained as described above can be used in a variety of forms depending on the structure of the application for the translucent cover or the like, such as in the form of a tube, a plate, a curved surface, a sphere, an elliptical sphere, a cup, or a bowl or the like.

The arc tube of the present invention is obtained by fabricating a formed body (green body) in the shape of an arc tube by a forming means such as an extrusion molding method, an injection molding method, or a cast molding method, using a slurry or paste made from the aforementioned aluminum nitride powder, sintering agent, and organic binder, and then dewaxing, firing, and annealing according to the aforementioned conditions.

The arc tube can have a variety of shapes depending on the field of application, and for example can be a simple cylindrical shape, or a structure with a spherical hollow part in a section of a cylinder, or can be another shape.

The present invention provides an aluminum nitride sintered body that can be suitably used as arc tube material for a light source with high optical transmissivity and especially high illumination efficiency, and which has a smooth surface in an unpolished condition after firing. This type of aluminum nitride sintered body can be used as an arc tube material even without a separate polishing process. Therefore, the use of the aluminum nitride sintered body of the present invention is particularly preferable for manufacturing arc tubes which are difficult to polish because of a complex shape.

EXAMPLES

The present invention will be described below using examples, but the present invention is not restricted to these examples.

Note, the following methods were used for measuring the various physical properties in the examples and the comparative examples.

1) Arithmetic Mean Surface Height Ra

The surface roughness was measured using Surfcom 470A manufactured by Tokyo Seimitsu Co., Ltd. at a tracing speed of 0.3 mm/second, a cutoff of 0.8, and a measurement length of 2.5 mm.

2) Maximum Surface Height Rz

The surface roughness was measured using Surfcom 470A manufactured by Tokyo Seimitsu Co., Ltd. at a tracing speed of 0.3 mm/second, a cutoff of 0.8, and a measurement length of 0.5 mm.

3) Concentration of Impurities

The concentration of metal impurities (concentration of metal elements) was measured by crushing and powdering the aluminum nitride sintered body, dissolving in an alkaline solution, neutralizing the solution with acid, and subjecting the solution to ICP emission analysis using an "ICP-1000" manufactured by Shimadzu Corporation.

The concentration of carbon was measured by powdering the aluminum nitride sintered body, combusting the powder in an oxygen gas flow, and measuring the amount of CO and $CO_2$ gas produced using "EMIA-110" manufactured by Horiba Ltd.

The concentration of oxygen was measured by crushing and powdering the aluminum nitride sintered body, and measuring the amount of CO gas produced in a graphite container by high temperature thermolysis using "EMGA-2800" manufactured by Horiba Ltd.

Furthermore, the concentration of each of the impurities in the aluminum nitride powder was measured by the same method as that used for the aforementioned powdered aluminum nitride sintered body.

4) Thermal Conductivity

The thermal conductivity was measured by a laser flash method using a thermal constant measuring device PS-7 manufactured by Rigaku Electric Co., Ltd. A correction for thickness was made using a calibration curve.

5) Optical Transmissivity

The optical transmissivity of a tube shaped aluminum nitride sintered body was determined by measuring the amount of light that came out when a halogen light was inserted into an integrating sphere using optic fiber and the end of the optic fiber was covered with the sample, as shown in FIG. 1. The transmissivity was expressed in percentage relative to the amount of light obtained without covering the fiber with the sample, in other words, relative to the amount of light obtained with air as reference. The thickness of the sample was 0.8 mm.

Example 1

Nylon balls (surface hardness of 100 $kgf/mm^2$ or less, density of 3.5 $g/cm^3$) with a diameter of 15 mm comprising a steel core covered with nylon were placed in a nylon pot with an internal volume of 2.4 L, and then 5 parts of calcium aluminate compound ($Ca_3Al_2O_6$) with a specific surface area of 3.75 m²/g and an average grain diameter of 1.8 μm as the sintering agent powder, and 40 weight parts of ethanol as solvent were added to and wet-mixed with 100 weight parts of aluminum nitride powder with an average grain diameter of 1.3 μm, a specific surface area of 3.39 m²/g, an oxygen concentration of 0.8 wt %, and a metal element concentration of 35 ppm. At this time, the aforementioned nylon balls filled 40% of the internal volume (apparent volume) of the pot. Mixing was performed by rotating the pot for 3 hours at 70 rpm. Furthermore, the slurry obtained was dried to obtain an aluminum nitride powder.

Next, 10 g of the aluminum nitride powder obtained was preliminarily formed into a formed body with a diameter of 40 mm and a thickness of 6 mm using a monoaxial forming device, and permanent forming was performed using a CIP molding machine by applying a load of 3 t/cm². The formed body obtained by the aforementioned operation was fired for 30 hours at a firing temperature of 1880° C. in a gas atmosphere that included a reducing substance and nitrogen, using a setter made of aluminum nitride, to obtain a sintered body with a diameter of 30 mm and a thickness of 5 mm. The manufacturing conditions of the aluminum nitride sintered body and the characteristics of the aluminum nitride sintered body obtained are shown in Table 1.

Example 2

The same operation as Example 1 was performed with the exception that the maximum temperature retention time was 50 hours. The manufacturing conditions of the aluminum nitride sintered body and the characteristics of the aluminum nitride sintered body obtained are shown in Table 1.

Example 3

The same operation as Example 1 was performed with the exception that the maximum temperature retention time was 100 hours. The manufacturing conditions of the aluminum nitride sintered body and the characteristics of the aluminum nitride sintered body obtained are shown in Table 1.

Example 4

The sintered body obtained in Example 1 was placed in a setter made of aluminum nitride that contained 3 g of alumina powder as the aluminum compound with high temperature degradability, and annealing was performed for 30 hours at a temperature of 1880° C. to obtain an aluminum nitride sintered body. The manufacturing conditions of the aluminum nitride sintered body and the characteristics of the aluminum nitride sintered body obtained are shown in Table 1.

Example 5

An aluminum nitride sintered body was obtained by performing the same operation as Example 4 with the exception that the type of aluminum compound with high temperature degradability in the annealing process was AlN. The manufacturing conditions of the aluminum nitride sintered body and the characteristics of the aluminum nitride sintered body obtained are shown in Table 1. Note, the aluminum nitride with high temperature degradability that was used in the annealing process was SH30 (aluminum nitride sintered body manufactured by Tokuyama).

Example 6

The same operation as Example 1 was performed with the exception that 2 parts of sintering agent were added. The manufacturing conditions of the aluminum nitride sintered body and the characteristics of the aluminum nitride sintered body obtained are shown in Table 1.

Example 7

The same operation as Example 1 was performed with the exception that 10 parts of sintering agent were added. The manufacturing conditions of the aluminum nitride sintered body and the characteristics of the aluminum nitride sintered body obtained are shown in Table 1.

Example 8

The same operation as Example 1 was performed with the exception that the material of the firing setter was boron nitride. The manufacturing conditions of the aluminum nitride sintered body and the characteristics of the aluminum nitride sintered body obtained are shown in Table 1.

Comparative Example 1

The same operation as Example 1 was performed with the exception that a sintering agent was not added. The manufacturing conditions of the aluminum nitride sintered body and the characteristics of the aluminum nitride sintered body obtained are shown in Table 1.

Comparative Example 2

The same operation as Example 1 was performed with the exception that 0.5 parts of sintering agent were added. The manufacturing conditions of the aluminum nitride sintered body and the characteristics of the aluminum nitride sintered body obtained are shown in Table 1.

Comparative Example 3

The same operation as Example 1 was performed with the exception that 20 parts of sintering agent were added. The manufacturing conditions of the aluminum nitride sintered body and the characteristics of the aluminum nitride sintered body obtained are shown in Table 1.

Comparative Example 4

The same operation as Example 1 was performed with the exception that the type of sintering agent was yttrium oxide, and 5 parts thereof were added. The manufacturing conditions of the aluminum nitride sintered body and the characteristics of the aluminum nitride sintered body obtained are shown in Table 1.

Comparative Example 5

The same operation as Example 1 was performed with the exception that the material of the firing setter was carbon. The manufacturing conditions of the aluminum nitride sintered body and the characteristics of the aluminum nitride sintered body obtained are shown in Table 1.

TABLE 1

| | No. | Manufacturing Method Sintering Agent Type | Amount Added Parts | Forming | Firing Temp. °C | Time hours | Setter | Atmosphere | Annealing Temp. °C | Time hours | Additive |
|---|---|---|---|---|---|---|---|---|---|---|---|
| Example | 1 | C3A | 5 | CIP | 1880 | 30 | AlN | Reductive $N_2$ | | | |
| | 2 | C3A | 5 | CIP | 1880 | 50 | AlN | Reductive $N_2$ | | | |
| | 3 | C3A | 5 | CIP | 1880 | 100 | AlN | Reductive $N_2$ | | | |
| | 4 | C3A | 5 | CIP | 1880 | 30 | AlN | Reductive $N_2$ | 1880 | 30 | Al2O3 |
| | 5 | C3A | 5 | CIP | 1880 | 30 | AlN | Reductive $N_2$ | 1880 | 30 | AlN |
| | 6 | C3A | 2 | CIP | 1880 | 30 | AlN | Reductive $N_2$ | | | |
| | 7 | C3A | 10 | CIP | 1880 | 30 | AlN | Reductive $N_2$ | | | |
| | 8 | C3A | 5 | CIP | 1880 | 30 | BN | Reductive $N_2$ | | | |
| Compa | 1 | None | 0 | CIP | 1880 | 30 | AlN | Reductive $N_2$ | | | |
| | 2 | C3A | 0.5 | CIP | 1880 | 30 | AlN | Reductive $N_2$ | | | |
| | 3 | C3A | 20 | CIP | 1880 | 30 | AlN | Reductive $N_2$ | | | |
| | 4 | Y2O3 | 5 | CIP | 1880 | 30 | AlN | Reductive $N_2$ | | | |
| | 5 | C3A | 5 | CIP | 1880 | 30 | C | Reductive $N_2$ | | | |

| | No. | Arithmetic Mean Surface Height Ra μm | Maximum Surface Height Rz μm | Grain Diameter μm | Oxygen Concentration ppm | Concentration of elements other than O, N. Al ppm | Total Transmissivity of Tube Shape % | Thermal Conductivity W/mK |
|---|---|---|---|---|---|---|---|---|
| Example | 1 | 0.4 | 4.2 | 13.5 | 400 | 180 | 87.0 | 210 |
| | 2 | 0.5 | 5.7 | 15.2 | 300 | 170 | 88.3 | 218 |
| | 3 | 0.8 | 6.5 | 17.3 | 300 | 158 | 89.5 | 220 |
| | 4 | 0.7 | 6.3 | 16.1 | 300 | 185 | 94.0 | 211 |
| | 5 | 0.7 | 6.2 | 16.3 | 300 | 175 | 94.5 | 207 |
| | 6 | 0.6 | 6.0 | 14.6 | 400 | 190 | 86.0 | 202 |
| | 7 | 0.5 | 5.2 | 13.1 | 400 | 190 | 86.5 | 230 |
| | 8 | 0.5 | 5.2 | 13.6 | 400 | 187 | 86.8 | 209 |
| Compa | 1 | 2.1 | 17.1 | 16.5 | 3000 | 380 | 40.0 | 120 |
| | 2 | 2.5 | 18.3 | 15.1 | 500 | 360 | 55.0 | 170 |
| | 3 | 2.9 | 28.0 | 12.9 | 500 | 460 | 68.5 | 190 |
| | 4 | 7.5 | 31.0 | 13.7 | 700 | 580 | 35.8 | 229 |
| | 5 | 5.0 | 23.1 | 14.1 | 300 | 410 | 55.8 | 211 |

C3A = $Ca_3Al_2O_6$
CIP = Cold Isostatic Press

The invention claimed is:

1. An aluminum nitride sintered body having, in a condition immediately after firing, an oxygen concentration of 450 ppm or lower, a concentration of impurity elements excluding oxygen, nitrogen, and aluminum of 350 ppm or less, an average crystal grain diameter of between 2 μm and 20 μm, an arithmetic mean surface height Ra of 0.8 μm or less, and an arithmetic maximum surface height Rz of 10 μm or less.

2. An arc tube comprising an aluminum nitride sintered body according to claim 1.

3. The aluminum nitride sintered body of claim 1, wherein a sintering agent of the aluminum nitride sintered body comprises calcium aluminate.

* * * * *

UNITED STATES PATENT AND TRADEMARK OFFICE
CERTIFICATE OF CORRECTION

PATENT NO.        : 8,597,743 B2                                    Page 1 of 1
APPLICATION NO.   : 12/063389
DATED             : December 3, 2013
INVENTOR(S)       : Kanechika et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this
Twenty-second Day of September, 2015

Michelle K. Lee
*Director of the United States Patent and Trademark Office*